United States Patent [19]

Houston

[11] Patent Number: 5,722,636
[45] Date of Patent: Mar. 3, 1998

[54] DOUBLE DISK GATE ASSEMBLY FOR BLOCK AND BLEED TYPE VALVES

[76] Inventor: James L. Houston, 3534 E. 109 St. S., Tulsa, Okla. 74137

[21] Appl. No.: 768,408

[22] Filed: Dec. 18, 1996

[51] Int. Cl.$^6$ ........................................ F16K 3/14
[52] U.S. Cl. ............................... 251/167; 251/203
[58] Field of Search ............................ 251/167, 203

[56] References Cited

U.S. PATENT DOCUMENTS

| | | | |
|---|---|---|---|
| 983,960 | 2/1911 | Watson | 251/167 |
| 2,394,128 | 2/1946 | Wennerby | 251/167 |
| 2,502,689 | 4/1950 | Yant | 251/167 |
| 2,541,968 | 2/1951 | Laurent | 251/167 X |
| 3,198,478 | 8/1965 | Johnston | 251/167 X |
| 4,301,993 | 11/1981 | Waller | 251/167 |

*Primary Examiner*—John Vox
*Attorney, Agent, or Firm*—Frank J. Catalano; Scott R. Zingerman

[57] ABSTRACT

A valve gate for sealing the inlet from the outlet of a block and bleed type valve consists of two independent disk-like members which are interconnected by a slide mechanism allowing the disk-like members to be moved simultaneously forwardly in a first configuration, to be moved simultaneously rearwardly in a second configuration and to float and, in a specially preferred embodiment, to pivot with respect to each other between the first and second configurations so as to facilitate release of the disk-like members from the valve seat on withdrawal. An upper disk-like member to seal the inlet and a lower disk-like member to seal the outlet are connected by one or more members engaging mounting frames fixed thereto. One of the mounting frames is connected to the valve stem for horizontal movement of one of the disk-like members into and out of substantial registration with either the inlet or the outlet in response to operation of the valve stem. The frames are engaged for relative horizontal movement of the other disk-like member into and out of approximately substantial registration with either the outlet or the inlet and for relative limited floatation and pivoting of one of disk-like member relative to the other into and out of substantial registration with either the outlet or the inlet.

13 Claims, 3 Drawing Sheets

DOUBLE DISK GATE ASSEMBLY FOR BLOCK AND BLEED TYPE VALVES

BACKGROUND OF THE INVENTION

This invention relates generally to valves and more particularly concerns block and bleed valves employing sliding gates to create pressure seals.

In a typical block and bleed valve, a gate assembly consisting of a wedge or two disks connected in a wedge configuration is insertable into the valve seat to close the fluid passage. The wedge angle is acute, typically five or fifteen degrees, and corresponds to a matching angle in the seat of the valve. The wedge is driven into the seat by the valve stem and forms a mechanically tight seal. To compensate for thermal expansion or movement of valve components, a pressure greater than the fluid passage pressure is applied to the bonnet body portion of the valve. This higher bonnet pressure enhances the tightness of the seal. Because of this tight seal, it is sometimes very difficult, if not impossible, to break the wedge loose from the seats to open the valve. Even in the two-disk configuration, the disks are in fully compressed relationship to each other in the valve closed condition so that there is no possibility of vertically altering their relative position in the valve without rearward movement of the disks. This problem is typically overcome by providing a knockout port in the valve body at the forward end of the wedge with a knockout shaft or ram inserted through the knockout port. If attempted withdrawal of the valve stem does not free the wedge from its seat, the ram is hammer driven into the wedge to release it. The wedge is then fully withdrawn from the seat by withdrawal of the valve stem.

This knockout type of valve works, but not without disadvantages. First, the knockout assembly is an expensive accessory. Second, if the valve stem withdrawal is attempted before the ram is used, the force applied to the stem to overcome the sealing force of the wedge can cause damage to the valve. Third, the repetitive application of hammering force against the wedge in the knockout procedure may eventually cause damage to the valve as well.

It is, therefore, a primary object of this invention to provide a block and bleed valve which does not require a knockout assembly to release a valve gate from a valve seat. Another object of this invention is to provide a block and bleed valve having a gate which collapses on withdrawal for easy release from a valve seat. It is also an object of this invention to provide a block and bleed valve which does not require any force other than the withdrawal of the valve stem to release a valve gate from a valve seat.

SUMMARY OF THE INVENTION

Known block and bleed type valves have an inlet in a first plane inclined upwardly about a first horizontal line for admitting fluid into the valve and an outlet in a second plane inclined downwardly about a second horizontal line below and parallel to the first horizontal line for exhausting fluid from the valve. The valve passes fluid from the inlet to the outlet at flow rates controlled by operation of a valve stem longitudinally aligned on a third horizontal line transverse to the first and second horizontal lines and passing between the inlet and the outlet.

In accordance with the present invention, a valve gate for sealing the inlet from the outlet consists of two independent disk-like members which are interconnected by a slide mechanism allowing the disk-like members to be moved simultaneously forwardly in a first configuration, to be moved simultaneously rearwardly in a second configuration and to float with respect to each other between the first and second configurations so as to facilitate release of the disk-like members from the valve seat on withdrawal. An upper disk-like member to seal the inlet and a lower disk-like member to seal the outlet are connected by one or more members engaging a first mounting frame fixed to a lower side of the upper disk-like member and a second mounting frame fixed to an upper side of the lower disk-like member. One of the mounting frames is connected to the valve stem for horizontal movement of its corresponding disk-like member into and out of substantial registration with either the inlet or the outlet in response to operation of the valve stem. The first and second mounting frames are engaged for relative horizontal movement of the other disk-like member into and out of approximately substantial registration with either the outlet or the inlet and for limited floatation of the other disk-like member relative to the one disk-like member into and out of substantial registration with either the outlet or the inlet.

In this embodiment, for example, the two disk-like members may be connected by a pin and slot mechanism. Pins on parallel plates fixed to one disk-like member are slidably engaged in slots on parallel plates fixed to the other disk-like member. The length and angle of the slots guides the flotation of the disk-like member so that, when one disk-like member is driven toward the valve seat by the valve stem, the disk-like members are driven apart and forwardly into contact with the valve seat. As pressure is applied to the bonnet body, the clearance between the pins and slots allows further movement of the disk-like member to create the pressure seal. When the bonnet body pressure is released and the valve stem is retracted, one disk-like member begins rearward movement and the angular relationship between the pins and slots releases the disk-like member to float together to allow for easy opening of the valve. As the stem retraction continues, the pins engage the other disk-like member for withdrawal of both disk-like members from the valve seat.

In one floating disk embodiment, the first frame is a carriage is fixed to a lower side of the upper disk-like member and is connected to the valve stem for horizontal movement of the upper disk-like member into and out of substantial registration with the inlet in response to operation of the valve stem. The second frame is a hanger fixed to an upper side of the lower disk-like member. One or more members engage the hanger to the carriage to suspend the lower disk-like member below the upper disk-like member for horizontal movement therewith into and out of approximately substantial registration with the outlet and to permit limited floatation of the lower disk-like member relative to the upper disk-like member into and out of substantial registration with the outlet. Preferably, the carriage includes a first pair of parallel plates transverse to the upper disk-like member and parallel to the third horizontal line or valve stem axis with each of the first pair of plates having a pair of elongated slots extending upwardly and away from the valve stem. Also, preferably, the hanger includes a second pair of parallel plates in sliding juxtaposition with the first pair of plates having pins extending transversely therefrom and slidably engaged in corresponding slots. It is further preferred that the pins have diameters less than the width of their corresponding slots.

In another specially preferred pivotal embodiment, relative pivotal rotation of the disk-like members into and out of substantial registration with the inlet or outlet is also permitted.

In one example of this specially preferred pivotal embodiment, the carriage includes a first pair of parallel plates transverse to the upper disk-like member and parallel to the third horizontal line or stem axis with opposed elongated slots extending upwardly and away from the valve stem and the hanger includes a second pair of parallel plates in sliding juxtaposition with the first pair of plates, the second pair of plates having opposed pins extending transversely therefrom and slidably engaged in corresponding slots. Preferably, the pins have diameters less than the width of their corresponding slots.

In another and most preferred example of this specially preferred pivotal embodiment, the hanger includes a second pair of parallel plates in sliding juxtaposition with the first pair of plates, the second pair of plates having opposed elongated slots aligned with the slots of the first pair of plates. A rod extends through the slots in both pairs of plates. Preferably, the rod has a diameter less than the width of the slots. Furthermore, the hanger may include a third pair of parallel plates having opposed elongated slots aligned with the slots of the first and second pairs of plates, the second pair of plates being disposed between the first and third pairs of plates and the rod extending through the slots in all of the plates.

BRIEF DESCRIPTION OF THE DRAWINGS

Other objects and advantages of the invention will become apparent upon reading the following detailed description and upon reference to the drawings in which.

While the invention will be described in connection with floating and pivotal embodiments, it will be understood that it is not intended to limit the invention to those embodiments. On the contrary, it is intended to cover all alternates, modifications and equivalents as may be included within the spirit and scope of the invention as defined by the appended claims.

DETAILED DESCRIPTION OF THE INVENTION

Figure 1:
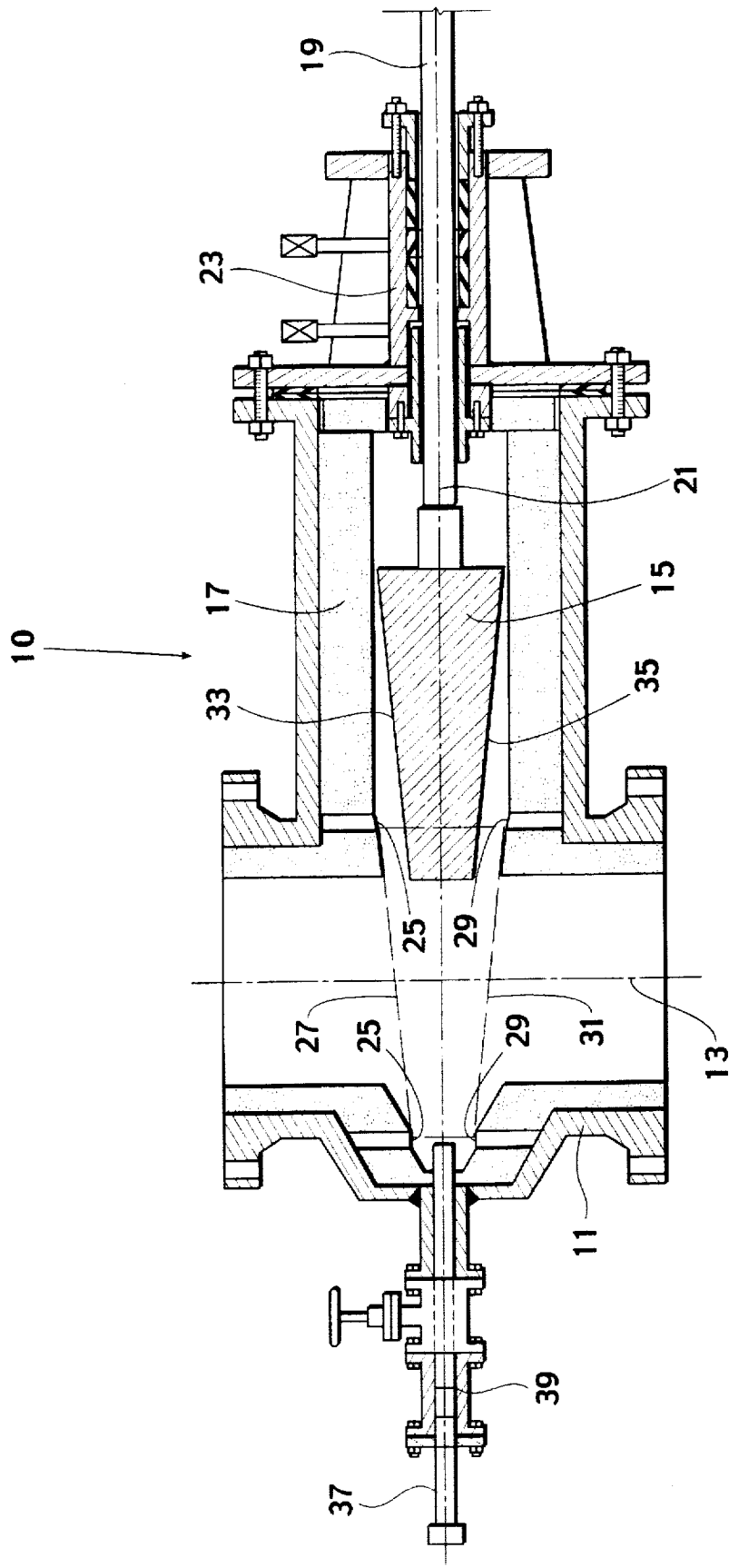
FIG. 1 is a sectional view taken along a vertical plane centered through a block and bleed valve employing a wedge gate assembly of the prior art.

Turning first to FIG. 1, a known block and bleed valve 10 is illustrated. Product fluid, such as liquid or gas at temperatures ranging up to 1000 degrees Fahrenheit or greater, flows through a cylinder 11 in the downward direction of its longitudinal axis 13. The cylinder 11 is typically a section of carbon steel pipe, generally 24 to 48 inches in diameter though not limited to such dimensions, with insulating refractory secured to its inner walls, perhaps by the use of bullhorn anchors. The rate of flow through the cylinder 11 is controlled by a wedge or fixed disk sealing gate 15. The sealing gate 15 is contained in a preferably rectangular bonnet body 17 fixed to the end of a valve stem 19 which is longitudinally aligned on the central horizontal axis 21 of the valve 10. As shown, the valve stem 19 is mounted for sliding in a guide bushing which extends into the body 17 from a packing gland 23 at the rear of the valve 10. The body 17 is typically of carbon steel with insulating refractory lining its interior walls, perhaps held in place by bullhorn anchors as shown. Stem mountings are well known in the art. A preferred packing gland 23 is described in detail in U.S. Pat. No. 5,290,046. A circular inlet seat 25, typically the edge of a cylindrical segment of pipe, defines a circular inlet lying in a first plane 27. The first plane 27 is angled upwardly from the front toward the rear of the valve 10 and the inlet seat 25 lies above the horizontal axis 21 extending through the valve stem 19 and the gate 15. A circular outlet seat 29, typically the edge of another cylindrical segment of pipe, defines a circular outlet lying in a second plane 31. The second plane 31 extends downwardly from the front toward the rear of the valve 10 and the outlet seat 29 lies below the horizontal axis 21. The planes 27 and 31 are substantially parallel to the upper and lower faces 33 and 35, respectively, of the gate 15. A knock-out shaft 37 at the forward end of the valve 10 is also aligned on the horizontal axis 21 and extends through another packing gland 39 into the cylinder 11. The pipe used to form the seats 25 and 29 will typically be carbon, stainless or chrome steel, depending on the operating temperature of the valve 10.

In operation, the valve 10 is fully open when the gate 15 is fully withdrawn into the bonnet body 17, as is shown in FIG. 1. In this condition, maximum flow of product from the inlet plane 27 to the outlet plane 31 occurs. In closing the valve 10, as the valve stem 19 is forwardly driven, the gate 15 moves horizontally along the axis 21 from the rear toward the forward end of the valve 10. When the upper and lower wedge faces 33 and 35 fully abut the inlet and outlet seats 25 and 29, respectively, the valve 10 is fully closed. This provides a mechanically tight seal of the gate 15 within the cylinder 11. However, the pressure maintained in the valve body 17 is generally greater than the pressure in the cylinder 11. For example, if the bonnet body pressure is in a range of 45 psi, the cylinder pressure may be in a range of 40 psi. Thus, in addition to the mechanical seal, the pressure differential further enhances the tightness of the seal. Moreover, thermal expansion resulting from the high temperature of the product flowing through the cylinder 11 also increases the tightness of the seal. Consequently, when it is desired to reopen the valve 10 by withdrawal of the gate 15 from the seats 25 and 29, the force that must be exerted on the valve stem 19 may not be sufficient to accomplish the task without damage to the valve 10. To eliminate this risk, the knock-out shaft 37 is driven against the forward end of the gate 15 by manually striking a hammer against the forward end of the knock-out shaft 37 until the wedge 15 is dislodged from its sealed condition between the seats 25 and 29.

Figure 3:
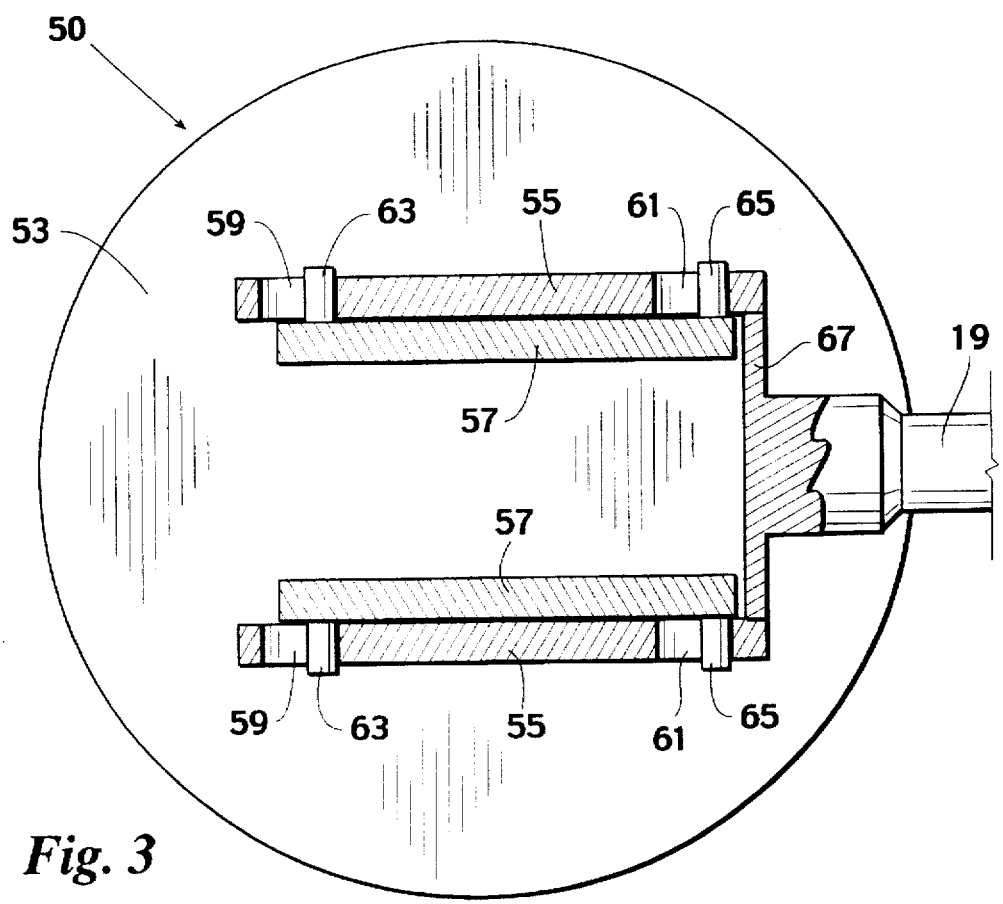
FIG. 3 is a sectional view taken along the line 3—3 of FIG. 2.
Figure 2:
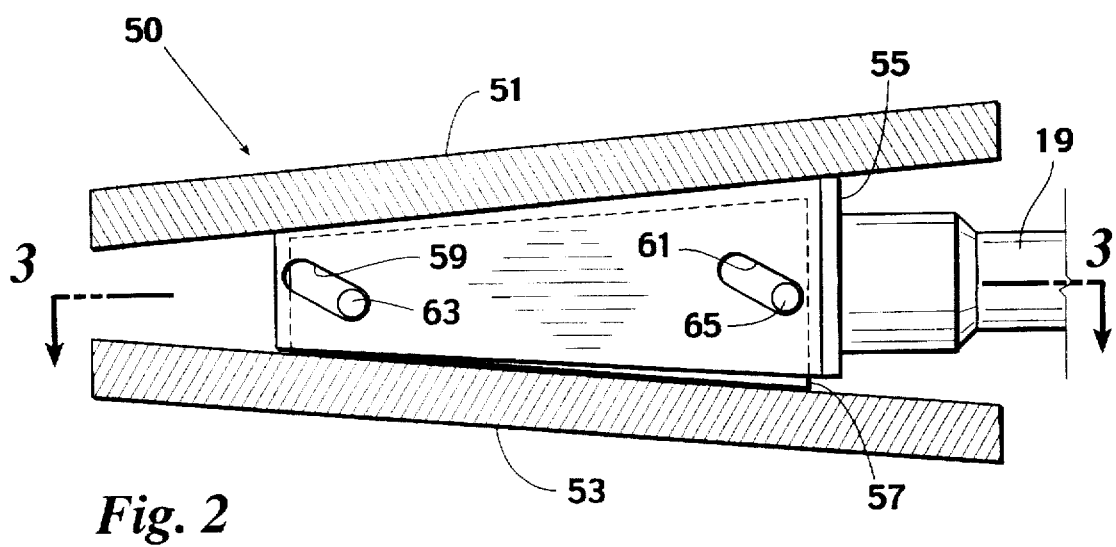
FIG. 2 is a side elevation view of a floating disk embodiment of a double disk gate assembly for use in place of the wedge gate assembly of FIG. 1.

Turning now to FIGS. 2 and 3, an embodiment of a floating disk sealing gate 50 for use in place of the wedge-type gate 15 of the valve 10 shown in FIG. 1 is illustrated. The floating disk gate 50 consists of two independent carbon steel disks 51 and 53. The upper disk 51 has a pair of substantially vertical and substantially parallel plates 55 welded to its lower surface, preferably equally spaced from a diameter of the disk 51 which is aligned with the central axis of the valve stem 19. The lower disk 53 also has a pair of substantially vertical plates 57 in substantially parallel alignment, also preferably equally spaced from the above referenced diameter and proximate the inner faces of the upper disk plates 55. The spaces between juxtaposed upper and lower disk plates 55 and 57 are such that the inner plates 57 on the lower disk are free to slide between the outer plates 55 on the upper disk 51 but are close enough to maintain the alignment of all of the plates 55 and 57 on substantially parallel axes. The upper disk plates 55 are provided with forward and rear elongated slots 59 and 61, respectively. The slots 59 and 61 extend on substantially parallel axes which are downwardly inclined from the front toward the rear of the gate 50. The lower disk plates 57 each have a forward and rear pin, 63 and 65 respectively, extending transversely outwardly therefrom and extending into and preferably through corresponding slots 59 and 61 in the upper disk plates 55. The diameter of the pins 63 and 65 is such that they are free to slide within the elongated slots 59 and 61. Most preferably, the diameter of the pins 63 and 65 is sufficiently smaller than the width of the elongated slots 59 and 61 so that, in addition to riding in the direction of the slots 59 and 61, the pins 63 and 65 may have slight vertical movement within the slots 59 and 61 without any horizontal movement of the pins 63 and 65 within the slots 59 and 61. A connector plate 67, preferably vertical, extends between the upper disk plates 55 and is fixed to the valve stem 19. As shown, the plates 55, 57 and 67 are configured so that, with the connector plate 67 fixed to the valve stem 19, the upper disk 51 is inclined at a suitable angle for mating with the inlet seat 25 of the cylinder 11 and the lower disk 53 is hung beneath the upper disk 51 at an angle suitable for mating with the outlet seat 29 of the cylinder 11.

In operation, if the wedge-type gate 15 of FIG. 1 is replaced by the double pin floating disk gate 50 of FIGS. 2 and 3, as the valve goes from the open to the closed condition with the valve stem 19 moving in a forward direction along the horizontal axis 21, the bottom ends of the elongated slots 59 and 61 engage with the pins 63 and 65 to carry the lower disk 53 in a forward horizontal direction in simultaneous movement with the upper disk 51. As the disks 51 and 53 are wedged in place against the inlet and outlet seats 25 and 29, respectively, of the cylinder 11, the continued forward urging of the upper disk 51 by the valve stem 19 against the resistive force applied to the lower disk 53 by the outlet seat 29 causes the pins 63 and 65 to adjust vertically in their respective slots 59 and 61 so as to assure a proper mating of the disks 51 and 53 with the seats 25 and 29 despite any shifts or irregularities in angular alignment that may be built into the valve 10 or that may occur as the result of wear, thermal expansion or other causes. When the gate 50 is to be withdrawn from its closed position between the seats 25 and 29, as the valve stem 19 is withdrawn, the angle of the slots 59 and 61 permit and cause the disks 51 and 53 to be drawn toward each other to assist in freeing the disks 51 and 53 from the seats 25 and 29. When the upper disk 51 has been withdrawn sufficiently that the upper ends of the elongated slots 59 and 61 engage the pins 63 and 65, then the lower disk 53 is transported horizontally simultaneously with the upper disk 51 into the body 17. Thus, the need for the knock-out shaft 37 and the packing gland 39 is reduced and possibly eliminated.

Figure 5:
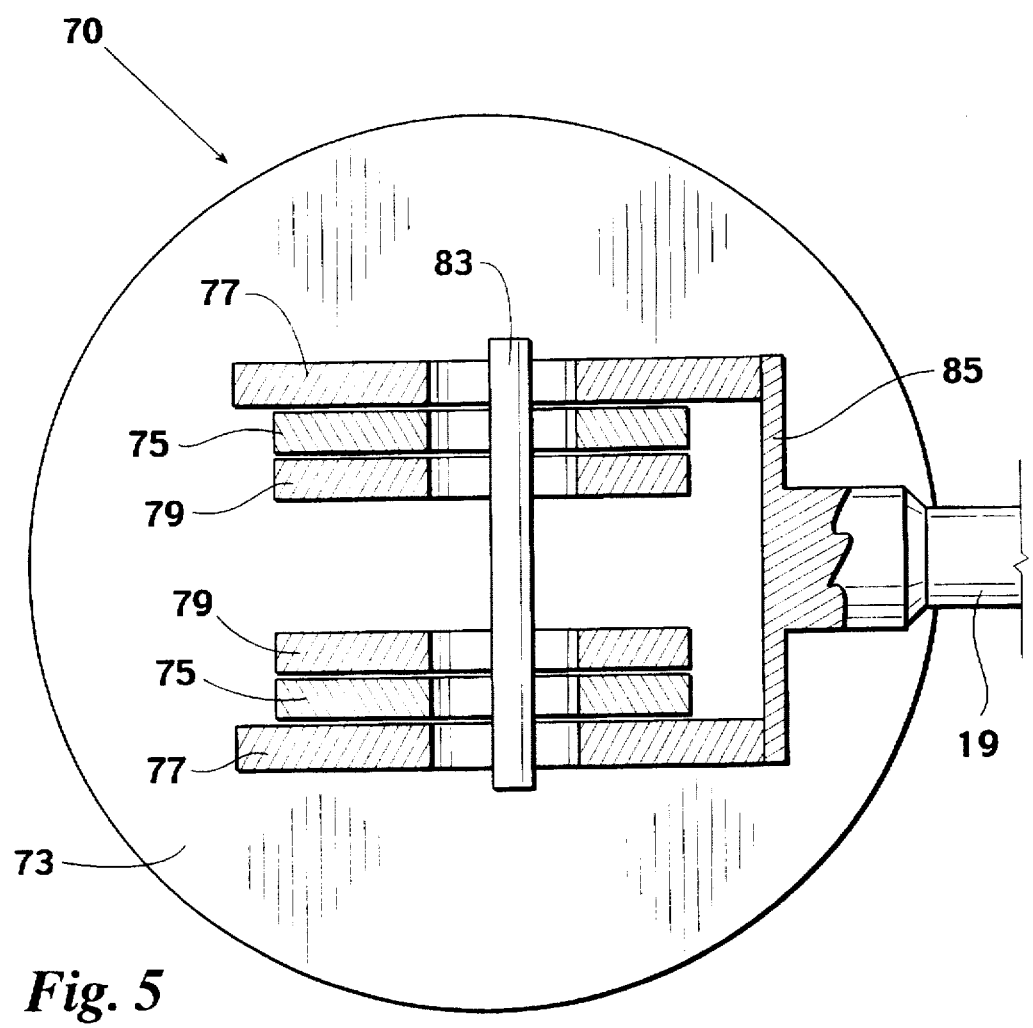
FIG. 5 is a sectional view taken along the line 5—5 of FIG. 4.
Figure 4:
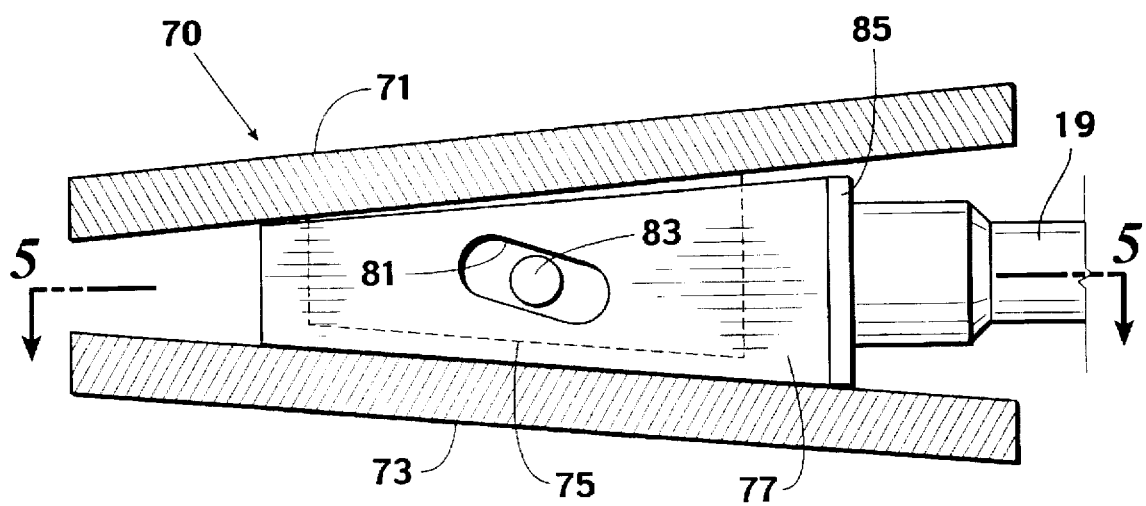
FIG. 4 is a side elevation view of a preferred pivotal disk embodiment of a double disk gate assembly for use in place of the wedge gate assembly of FIG. 1.

Turning now to FIGS. 4 and 5, a specially preferred pivotal embodiment of the floating disk sealing gate is illustrated. In this pivotal embodiment, the sealing gate 70 includes upper and lower disks 71 and 73 with substantially vertical and parallel plates 75 and 77 fixed thereto in configuration similar to that illustrated and described in relation to FIGS. 2 and 3. In this configuration, it is preferred, though not necessary, that a third pair of plates 79 fixed to the lower disk 73 cooperates with the other lower disk plates 77 to sandwich the upper disk plates 75 therebetween. The spacing between all of these disks 75, 77 and 79 is coordinated to permit the aligned floating action described in relation to the embodiment disclosed in FIGS. 2 and 3. In the specially preferred pivotal embodiment, however, each of the plates 75, 77 and 79 is provided with a single slot 81 which is elongated and angled downwardly from the front toward the rear of the gate 70. The slots 81 are disposed in the plates 75, 77 and 79 so as to be in alignment at substantially the diameters of the disks 71 and 73 which are transverse to the horizontal axis 21 through the valve 10. A single rod 83 extends through all of the slots 81. The diameter of the rod 83 is preferably slightly less than the width of the slots 81 to permit relative vertical movement of the disks 71 and 73. A connection plate 85 secured to one or more of the lower disk plates 77 and 79 is fixed to the end of the valve stem 19 to permit the lower disk 73 to be horizontally driven in response to the motion of the valve stem 19. In operation, with the specially preferred pivotal embodiment of the gate 70 mounted in the valve 10 illustrated in FIG. 1, as the gate 70 moves from the bonnet body 17 into the valve cylinder 11, the lower disk plates 77 and 79 engage the rod 83 at the bottom ends of their slots 81 and drive the lower plate 73 in a forward direction. As the rod 83 moves forwardly, it engages the upper ends of the slots 81 in the upper disk plates 75, thus causing the upper disk 71 to be simultaneously forwardly driven with the lower disk 73. When the disks 71 and 73 are firmly mated against the valve seats 25 and 29, the upper disk 71 is free to move vertically in relation to the lower disk 73 for a distance limited by the width of the elongated slots 81. This allows some tolerance for the gate 70 to adapt to the specific configuration of the seats 25 and 29 in the valve 10, as also occurred in the floating disk embodiment illustrated in FIGS. 2 and 3. However, since the disks 71 and 73 are engaged by the single rod 81 extending through their plates 75, 77 and 79, the disks 71 and 73 are also free to hinge relative to each other about the rod 83, thus providing increased adaptability of the gate 70 to the seats 25 and 29 in the valve 10. On withdrawal of the gate 70, the upper end of the slots 81 in the lower disk plates 77 and 79 engage with the rod 83. As the rod 83 is pulled rearwardly, the slots 81 permit the plates 71 and 73 to be drawn toward each other and to pivot to facilitate freeing the gate 70 from its sealed position against the seats 25 and 29 of the valve 10.

Specific embodiments of the invention have been described in relation to vertical flow paths through the valve cylinder 11 and horizontal alignment of the valve stem 19. Such directional references have been made only to facilitate description of the relationship of the components of the valve 10 and are not intended to restrict the orientation of the valve 10 itself in any application. The specific embodiments have been described in relation to the valve stem 19 being connected to either the upper or lower disk plates and with respect to pins and elongated slots associated with upper and lower disks, respectively. The plates to which the valve stem are connected, the angular relationship of the slots, the selection of plates in which slots and pins are incorporated, the width of the slots which determines the freedom of vertical movement between the plates, the number of plates employed and how the plates are aligned or sandwiched may all be selected to accommodate the particular application or particular design considerations of the user. The disks may also alternatively be disk-like in that they are not necessarily circular. While the double disk gate of the invention has been described in relation to a prior art valve which uses a cylindrical product passage, the product passage may be other than cylindrical.

Thus, it is apparent that there has been provided, in accordance with the invention, a double disk gate assembly that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A sealing gate for a block and bleed type valve having an inlet in a first plane inclined upwardly about a first horizontal line for admitting fluid into the valve and an outlet in a second plane inclined downwardly about a second horizontal line below and parallel to the first horizontal line for exhausting fluid from the valve, the valve passing fluid from the inlet to the outlet at flow rates controlled by operation of a valve stem longitudinally aligned on a third horizontal line transverse to the first and second horizontal lines and passing between the inlet and the outlet comprising:

an upper disk-like member for sealing the inlet;

a lower disk-like member for sealing the outlet;

a first mounting frame fixed to a lower side of said upper disk-like member;

a second mounting frame fixed to an upper side of said lower disk-like member;

one of said first and second mounting frames being connected to the valve stem for horizontal movement of its corresponding disk-like member into and out of substantial registration with its respective inlet and outlet in response to operation of the valve stem; and means engaging said first and second mounting frames for relative horizontal movement of said disk-like member corresponding to the other of said first and second mounting frames into and out of approximately substantial registration with its respective outlet and inlet and for limited floatation of said disk-like member corresponding to said other mounting frame relative to said disk-like member corresponding to said one mounting frame into and out of substantial registration with its respective outlet and inlet.

2. A sealing gate for a block and bleed type valve having an inlet in a first plane inclined upwardly about a first horizontal line for admitting fluid into the valve and an outlet in a second plane inclined downwardly about a second horizontal line below and parallel to the first horizontal line for exhausting fluid from the valve, the valve passing fluid from the inlet to the outlet at flow rates controlled by operation of a valve stem longitudinally aligned on a third horizontal line transverse to the first and second horizontal lines and passing between the inlet and the outlet comprising:

an upper disk-like member for sealing the inlet;

a lower disk-like member for sealing the outlet;

a carriage fixed to a lower side of said upper disk-like member and connected to the valve stem for horizontal movement of said upper disk-like member into and out of substantial registration with the inlet in response to operation of the valve stem;

a hanger fixed to an upper side of said lower disk-like member; and means engaging said hanger to said carriage for suspending said lower disk-like member below said upper disk-like member for horizontal movement therewith into and out of approximately substantial registration with the outlet and for permitting limited floatation of said lower disk-like member relative to said upper disk-like member into and out of substantial registration with the outlet.

3. A sealing gate according to claim 2, said carriage comprising a first pair of parallel plates transverse to said upper disk-like member and parallel to the third horizontal line, each of said first pair of plates having a pair of elongated slots extending upwardly and away from the valve stem.

4. A sealing gate according to claim 3, said hanger comprising a second pair of parallel plates in sliding juxtaposition with said first pair of plates, each of said second pair of plates having a pair of pins extending transversely therefrom, each of said pins slidably engaged in a corresponding one of said slots.

5. A sealing gate according to claim 4, said pins having diameters less than a width of said corresponding slots.

6. A sealing gate for a block and bleed type valve having an inlet in a first plane inclined upwardly about a first horizontal line for admitting fluid into the valve and an outlet in a second plane inclined downwardly about a second horizontal line below and parallel to the first horizontal line for exhausting fluid from the valve, the valve passing fluid from the inlet to the outlet at flow rates controlled by operation of a valve stem longitudinally aligned on a third horizontal line transverse to the first and second horizontal lines and passing between the inlet and the outlet comprising:

an upper disk-like member for sealing the inlet;

a lower disk-like member for sealing the outlet;

a carriage fixed to a lower side of said upper disk-like member and connected to the valve stem for horizontal movement of said upper disk-like member into and out of substantial registration with the inlet in response to operation of the valve stem;

a hanger fixed to an upper side of said lower disk-like member; and means engaging said hanger to said carriage for suspending said lower disk-like member below said upper disk-like member for horizontal movement therewith into and out of approximately substantial registration with the outlet and for permitting limited floatation and pivotal rotation of said lower disk-like member relative to said upper disk-like member into and out of substantial registration with the outlet.

7. A sealing gate according to claim 6, said carriage comprising a first pair of parallel plates transverse to said upper disk-like member and parallel to the third horizontal line, said first pair of plates having opposed elongated slots extending upwardly and away from the valve stem.

8. A sealing gate according to claim 7, said hanger comprising a second pair of parallel plates in sliding juxtaposition with said first pair of plates, said second pair of plates having opposed pins extending transversely therefrom, each of said pins slidably engaged in a corresponding one of said slots.

9. A sealing gate according to claim 8, said pins having diameters less than a width of said corresponding slots.

10. A sealing gate according to claim 7, said hanger comprising a second pair of parallel plates in sliding juxtaposition with said first pair of plates, said second pair of plates having opposed elongated slots aligned with said slots of said first pair of plates.

11. A sealing gate according to claim 10, engaging and permitting means comprising a rod extending through said slots in said first and second pairs of plates.

12. A sealing gate according to claim 11, said rod having a diameter less than a width of said slots.

13. A sealing gate according to claim 12, said hanger having a third pair of parallel plates having opposed elongated slots aligned with said slots of said first pair of plates, said second pair of plates being disposed between said first and third pairs of plates, said rod extending through said slots in said third pair of plates.

* * * * *